Dec. 19, 1933.  E. D. VANCIL  1,940,158
MOTOR MOUNT FOR MILLING MACHINES
Filed Feb. 13, 1930  2 Sheets-Sheet 1

Inventor
EDGAR D. VANCIL
By AHK Parsons
Attorney

Dec. 19, 1933. E. D. VANCIL 1,940,158
MOTOR MOUNT FOR MILLING MACHINES
Filed Feb. 13, 1930 2 Sheets-Sheet 2

Inventor
EDGAR D. VANCIL
By
Attorney

Patented Dec. 19, 1933

1,940,158

UNITED STATES PATENT OFFICE 1,940,158

MOTOR MOUNT FOR MILLING MACHINES

Edgar D. Vancil, Cincinnati, Ohio, assignor to The Cincinnati Milling Machine Company, Cincinnati, Ohio, a corporation of Ohio Application February 13, 1930. Serial No. 428,164

6 Claims. (Cl. 90—11)

This invention relates to improvements in milling machines or like machine tools and has particular reference to that type of machine which has been commercially designated as the motor in column type.

One of the principal objects of the present invention is the provision, in connection with a milling machine or similar machine tool having an enclosed motor drive, of improved mechanism for facilitating the ready and accurately aligned mounting of the prime mover or motive power member within the machine, in proper relation to the drive gearing of the machine designed to be actuated thereby.

A further object of the present invention is the provision, in connection with a machine of the nature described, of an improved generally adjustable support unit or motor mount structure which shall have the several parts so related as to satisfactorily accommodate different sizes of motor members or members having differently arranged supporting feet or lugs or differently drilled whereby varying motor units of different size or manufacture may be interchangeably, correctly mounted in operative relation to the other fixed parts of the machine for suitable actuation thereof.

An additional object of the present invention is the provision of an improved form of mounting or motor unit which will facilitate both the introduction of the motor unit itself within the machine and also the application of the coupling drive belt and application of proper operating tension to said belt.

A further object of the invention is the provision, in connection with removable support members capable of application to the motor unit prior to introduction of the same within a containing chamber of the machine, of improved automatic aligning means within the machine for cooperation with said motor supports and readily accessible clamp means for ultimately securing the motor and associate parts in properly aligned position in the receiving compartment therefor.

Other objects and advantages of the present invention should be readily apparent by reference to the following specification, considered in conjunction with the accompanying drawings illustrative of one embodiment thereof, but it will be understood that any modifications may be made in the exact structural details hereinafter disclosed, within the scope of the appended claims, without departing from or exceeding the spirit of the invention.

Referring to the drawings, in which like reference numerals indicate like parts:

Figure 1:
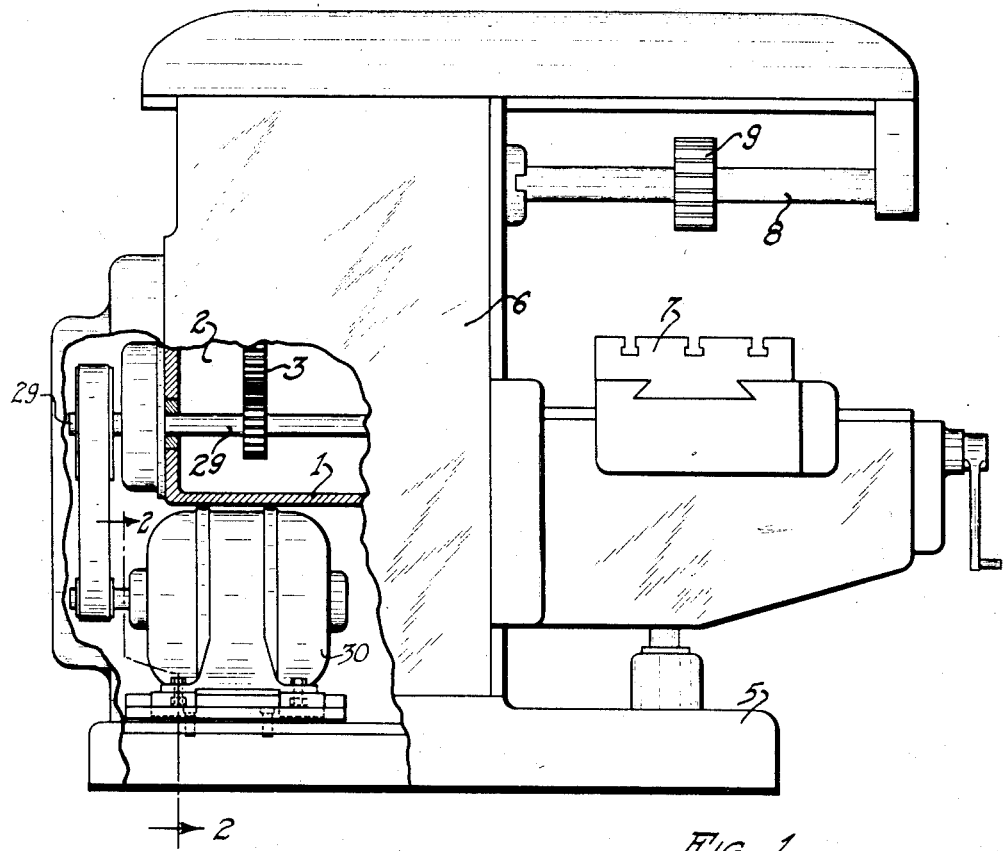
Figure 1 is an elevation showing the invention embodied in a machine tool.

In the drawings, the numeral 5 designates as an entirety the bed or base of a knee and column type of milling machine having rising therefrom the hollow column 6 adjustably supporting the table 7 and bearing the arbor 8 for the milling cutter 9. It will be noted that the column 6 is a hollow structure divided as by the web or transverse wall member 1, into an upper chamber 2 which contains the general transmission gearing 3 of the machine for actuation of the cutter, table and intermediate parts and which has been semi-diagrammatically indicated in Figure 1, for example. This transmission has as a lower terminal member the shaft 29, to which actuating power is supplied from member 30. The shaft and gearing are disposed in definite predetermined position within and with respect to the column of the machine, and for proper actuation thereof, it is necessary that, irrespective of size or make, the armature or drive shaft of the motor be in proper parallel relation with the driven shaft 29. The present invention relates, therefore, particularly to the means for insuring proper parallel mounting and retention of these units within the column structure.

Figure 2:
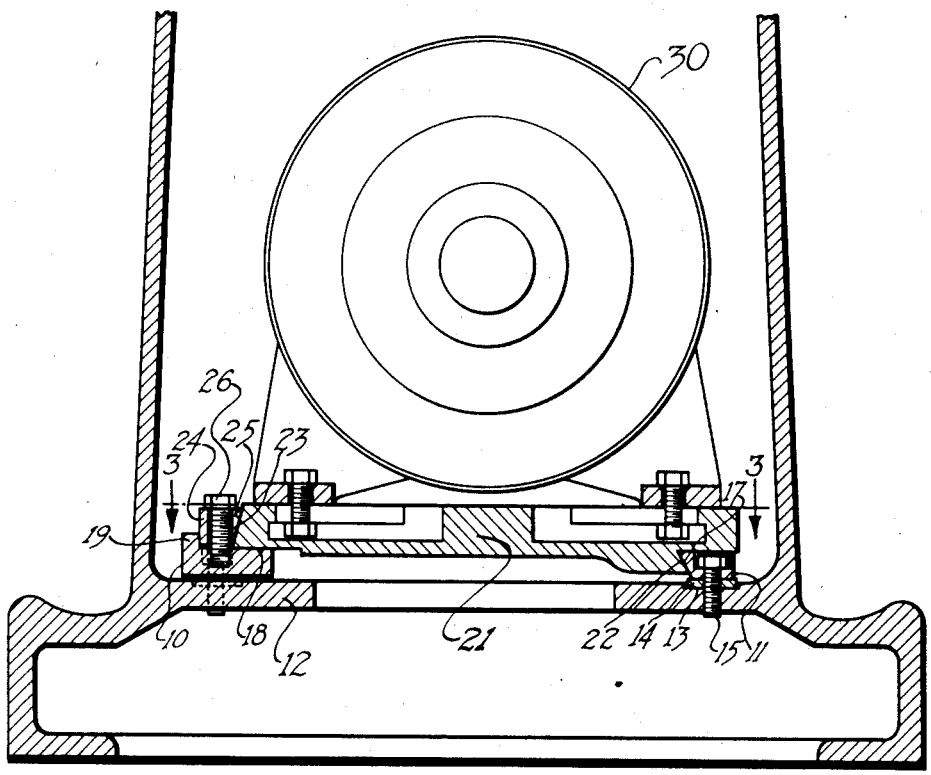
Figure 2 is a section on the line 2—2 of Figure 1.
Figure 3:
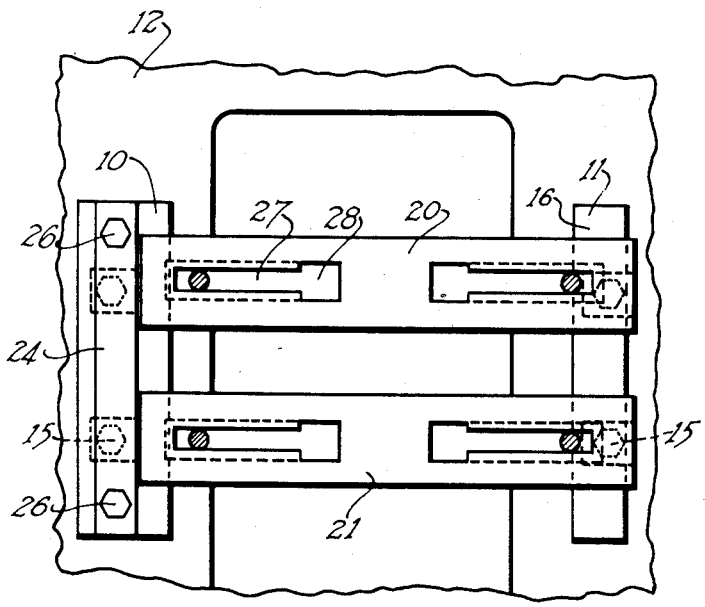
Figure 3 is a section on the line 3—3 of Figure 2.

The reference numerals 10 and 11 (Figure 3) represent parallel guide members that may be attached to a base or support such as 12, as shown in Figure 2. In this instance the member 12 is the base portion of a milling machine and in order to properly mount the members 10 and 11, the base has machined therein a plurality of spots 13 on which are placed the elevating pieces 14. These pieces form a level foundation upon which to place the members 10 and 11. The bolts 15 are threaded into the base 12, for fastening the guide members in parallel relation to one another and in parallel relation to a driven shaft 29. The guide member 11 has the bearing surface 16 and the beveled guide surface 17 while the member 10 is provided with the bearing surface 18 and the flange 19. A pair of parallel supports 20 and 21 are supported at one end on the bearing surface 16 of the member 11 and at the other end of the bearing surface 18 of the member 10. The ends of the members 20 and 21, which rest on the member 11 have a beveled guide surface 22 for cooperating with the surface 17 of the member 11, and the other ends are beveled as at 23 for cooperation with the clamping strip 24 which has an angular face 25 engaging the surfaces 23. The clamping strip 24 is provided with bolts 26 threaded into the member 10 for urging the strip into clamping engagement between the flange 19 and the surfaces 23. The clamping action which takes place is that the strip 24 acting through the bevel face 25 moves the members 20 and 21 longitudinally thereby forcing the faces 22 and 17 into clamping engagement and simultaneously drawing the ends of the members 20 and 21 into clamping engagement with the bearing surface 16. At the same time, the other ends of the members 20 and 21 are firmly clamped against the bearing face 18. It is thus seen that this clamping action has two effects—that is, it causes the members 20 and 21 to be held down against any lifting force and at the same time to be clamped against lateral movement. It may be noted that these members are laterally adjustable with respect to one another, thus providing for the variation in the spacing of the bolt holes in one direction in the device to be clamped thereto.

The members 20 and 21 are provided in their upper face with T-slots 27. These T-slots do not run out at the end of the member and, therefore, square holes, such as 28, are provided in the central part of the members 20 and 21 for the insertion of bolts into the T-slots. These T-slots are of sufficient length to provide for variations in the spacing of bolt holes in another direction of the device to be clamped thereto.

It will be noted that a support has been provided comprising a pair of parallel supporting members which may be adjusted to give variations in spacing in one direction, and that the supporting members have T-slots which provide for adjustment in spacing in another direction.

Figure 4:
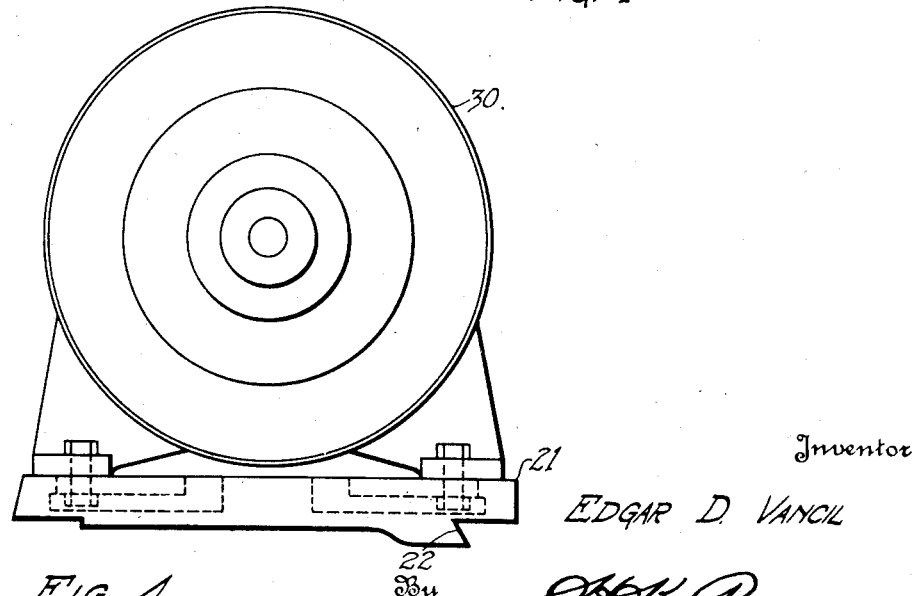
Figure 4 is a detail showing a motor and adjustable members assembled for introduction into a machine.

It is also apparent from Figure 4 that the members 20 and 21 may be attached to the motor 30 exterior of the machine with the guide surfaces 22 parallel to the axis of the motor. The whole assembly may then be slid into the machine on the guideways 10 and 11 which have previously been aligned parallel to a driven shaft to a point where the pulley on the motor is in the same plane with the pulley in the driven shaft. It is then only necessary to clamp the guide strip 24 to fix the parts in place. Since the motor space in a machine tool is rather limited, this construction permits the placing of the motor so that the extra space remaining will mostly be on one side of the motor providing a more convenient working spacing for clamping the strip 24 than previously obtained by dividing the space to provide working space on both sides of the motor. Thus a more convenient arrangement has been provided resulting in an enlarged working space without loss of efficiency. Attention is also invited to the fact that the construction is such that after the assembly as shown in Figure 4 has been introduced into the machine with the driving and driven pulleys in alignment a belt which is normally slightly short may be put on the pulleys and the clamping strip 24 used to draw the motor down to its support and thus put initial tension in the belt. In this case when the belt is put on, one end of the members 20 and 21 will be in a slightly raised position with respect to the surface 18 due to the motor being partially supported by the belt and the other end of the members will be supported on the member 11 with beveled surface 22 in engagement with the surface 17 thereby preventing a lateral shifting or lifting movement from occurring.

What is claimed is:

1. An adjustable mounting comprising a pair of parallel base members adapted to be positioned a fixed distance apart, one of said members having a pair of longitudinal faces intersecting at an acute angle forming a guideway, the other member having a flange extending longitudinally along its upper face, parallel supporting members adjustably mounted on said base members each having one end beveled and the other end notched to cooperate with said acute angled guideway, a locking strip carried by the other base member having a beveled face engaging the beveled ends of the supporting members, the opposite face of the strip abutting said flange, and means to clamp the locking strip to the base member whereby the supporting members may be wedged between the base members and thereby clamped in adjusted position.

2. A milling machine comprising a column having an upper transmission chamber and a lower motor chamber, a drive shaft journaled in the upper chamber for actuating a transmission therein, a V-shaped guide surface formed in the lower chamber parallel to the axis of said shaft, a prime mover having a rotor member, support strips with coplanar guide faces thereon intersecting at an acute angle attachable to the base of the prime mover with said faces parallel to the axis of said rotor whereby upon introduction of the prime mover into the lower chamber said guide faces will abut the V-shaped guide surface and automatically position the axis of the rotor in parallel driving relationship with the axis of said drive shaft.

3. An adjustable motor mounting comprising in combination a pair of longitudinal members adapted to be attached in parallel relation to a fixed base, one of said members having a guide surface thereon, a pair of support members adapted to be attached to the motor, said support members having T-slots formed in the upper face thereof for receiving motor clamping T-bolts, said slots permitting longitudinal adjustment of the bolts in accordance with the spacing of the bolt holes in the motor, and a locking strip carried by one of said longitudinal members cooperating with one end of said support members to clamp them simultaneously to said guide surface, of the other longitudinal member.

4. In a milling machine having a column, a motor chamber formed therein, and a main drive shaft journaled in the column above said chamber, and having a portion extending into said chamber, the combination of means for receiving and positioning a motor in said chamber with its axis parallel to said shaft including a pair of guide members adapted to be fixedly attached to the floor of said chamber in spaced parallel relation, one of said members having intersecting guide surfaces in parallel relation to the axis of said shaft, a pair of motor support members having intersecting guide surfaces at one end, means to secure said support members to the motor with their surfaces in parallel relation to the axis of the motor whereby upon introduction of the motor into said chamber with its axis substantially parallel to said shaft, one surface of the support members will cooperate with one surface of the guide members to automatically align the axis of the motor parallel to the axis of said shaft in one plane of adjustment, and means to clamp the motor support members to said guide members to align the motor parallel to the axis of said shaft in a second plane of adjustment.

5. An adjustable mounting for motors having bolt holes spaced along intersecting axes comprising in combination a pair of members adapted to be secured to a support in fixed parallel relationship, a second pair of members adapted to be fixed to a motor in spaced relation in accordance with the spacing of the motor bolt holes along one axis, said members having T-slots formed in the upper face thereof, T-bolts mounted in said slots and adapted to be spaced therein in accordance with the spacing of the motor bolt holes along a second axis, means to clamp the T-bolts to the motor with one end of the support members lying in a plane parallel to the axis of the motor, said parallel ends of the support members cooperating with the guide of one of said fixed members upon assembly therewith to align said motor, a wedge shaped member engageable with the opposite ends of said motor support members, and means to clamp said wedge shaped member to one of said fixed guide members to secure the support members and thereby the motor in fixed position.

6. In a milling machine having a transmission driving shaft and a motor for actuating the same, the combination of means for automatically positioning the axis of the motor in parallel relation with the axis of the shaft upon assembly with the machine comprising support members attachable to the motor, said support members having a guide surface at one end thereof, means to secure the support members to the prime mover with said guide surfaces lying in a plane parallel to the axis of said motor, additional guide means fixed in the base of the machine and lying in planes parallel to the axis of said shaft, and a single means engageable with the motor support members upon assembly of the motor with the machine to force said guide surfaces into contact with said guide means whereby the axis of the motor will be automatically aligned in parallel driving relationship to said shaft and also to clamp the motor against axial movement.

EDGAR D. VANCIL.